United States Patent
Draper

(10) Patent No.: US 9,835,135 B2
(45) Date of Patent: Dec. 5, 2017

(54) SYSTEM AND METHOD FOR CONTROLLING A WIND TURBINE

(71) Applicant: General Electric Company, Schenectady, NY (US)

(72) Inventor: Samuel David Draper, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1071 days.

(21) Appl. No.: 14/068,356

(22) Filed: Oct. 31, 2013

(65) Prior Publication Data

US 2015/0115608 A1 Apr. 30, 2015

(51) Int. Cl.
*F03D 7/02* (2006.01)
*F03D 9/25* (2016.01)

(52) U.S. Cl.
CPC .......... *F03D 7/028* (2013.01); *F03D 7/0292* (2013.01); *F03D 9/25* (2016.05); *F05B 2270/20* (2013.01); *F05B 2270/332* (2013.01); *Y02E 10/723* (2013.01)

(58) Field of Classification Search
CPC .......... F03D 7/028; F03D 7/0292; F03D 9/25; Y02E 10/723; F05B 2270/20; F05B 2270/332
See application file for complete search history.

(56) References Cited

U.S. PATENT DOCUMENTS

| | | | |
|---|---|---|---|
| 6,850,821 B2 | 2/2005 | Weitkamp | |
| 2002/0000723 A1* | 1/2002 | Weitkamp | F03D 7/0276 290/44 |
| 2009/0099702 A1 | 4/2009 | Vyas et al. | |
| 2012/0288371 A1 | 11/2012 | Grabau et al. | |
| 2013/0030772 A1 | 1/2013 | Laurberg et al. | |
| 2013/0035798 A1 | 2/2013 | Zhou et al. | |
| 2013/0140819 A1 | 6/2013 | Abdallah et al. | |
| 2013/0214534 A1 | 8/2013 | Nakamura et al. | |

(Continued)

FOREIGN PATENT DOCUMENTS

| | | |
|---|---|---|
| EP | 2302208 A1 | 3/2011 |
| EP | 2063108 A3 | 12/2011 |
| EP | 2527644 A2 | 11/2012 |

(Continued)

OTHER PUBLICATIONS

European Search Report and Written Opinion issued in connection with corresponding EP Application No. 14190166.0-1607 dated Mar. 18, 2015.

*Primary Examiner* — Dwayne J White
*Assistant Examiner* — Adam W Brown
(74) *Attorney, Agent, or Firm* — Dority & Manning, P.A.

(57) ABSTRACT

A method for controlling a wind turbine may generally include operating the wind turbine at an initial power output that is greater than a rated power output associated with the wind turbine. The wind turbine may have an anticipated operational life at the rated power output. In addition, the method may include decreasing a power output of the wind turbine over time in order to maintain an actual operating life of the wind turbine substantially equal to or greater than the anticipated operational life. A final power output of the wind turbine at an end of the anticipated operating life may be less than the rated power output.

20 Claims, 10 Drawing Sheets

(56) References Cited

U.S. PATENT DOCUMENTS

2013/0270827 A1* 10/2013 Couchman .............. F03D 7/028
                                                                                        290/44
2013/0320674 A1* 12/2013 Ingram .................... H02P 9/04
                                                                                        290/43

FOREIGN PATENT DOCUMENTS

| EP | 2531723 A2 | 12/2012 | | |
|----|------------|---------|---|---|
| EP | 2551519 A1 | 1/2013 | | |
| EP | 2577055 | 4/2013 | | |
| GB | WO 2012041326 A2 * | 4/2012 | ............ | F03D 7/028 |
| WO | WO 2011095519 | 8/2011 | | |
| WO | WO 2011150931 | 12/2011 | | |
| WO | 2013044925 A1 | 4/2013 | | |

\* cited by examiner

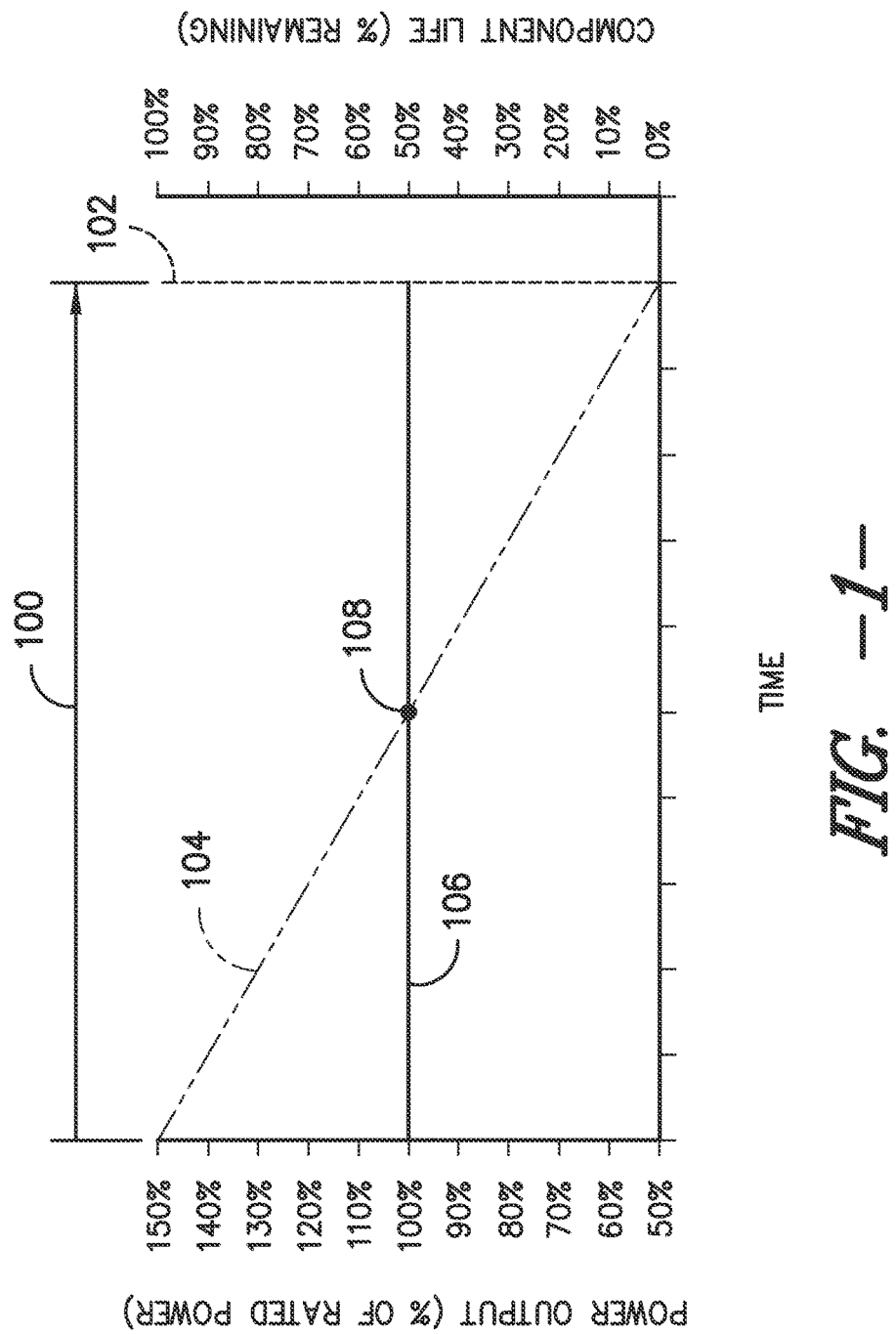
FIG. -1-

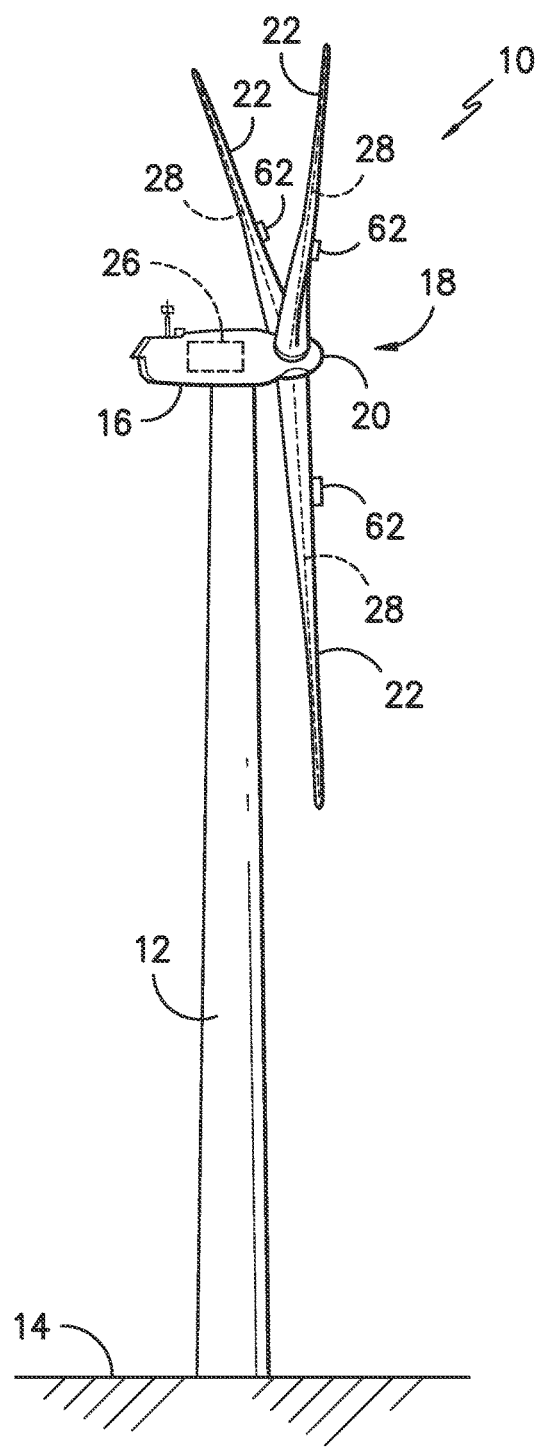
FIG. -2-

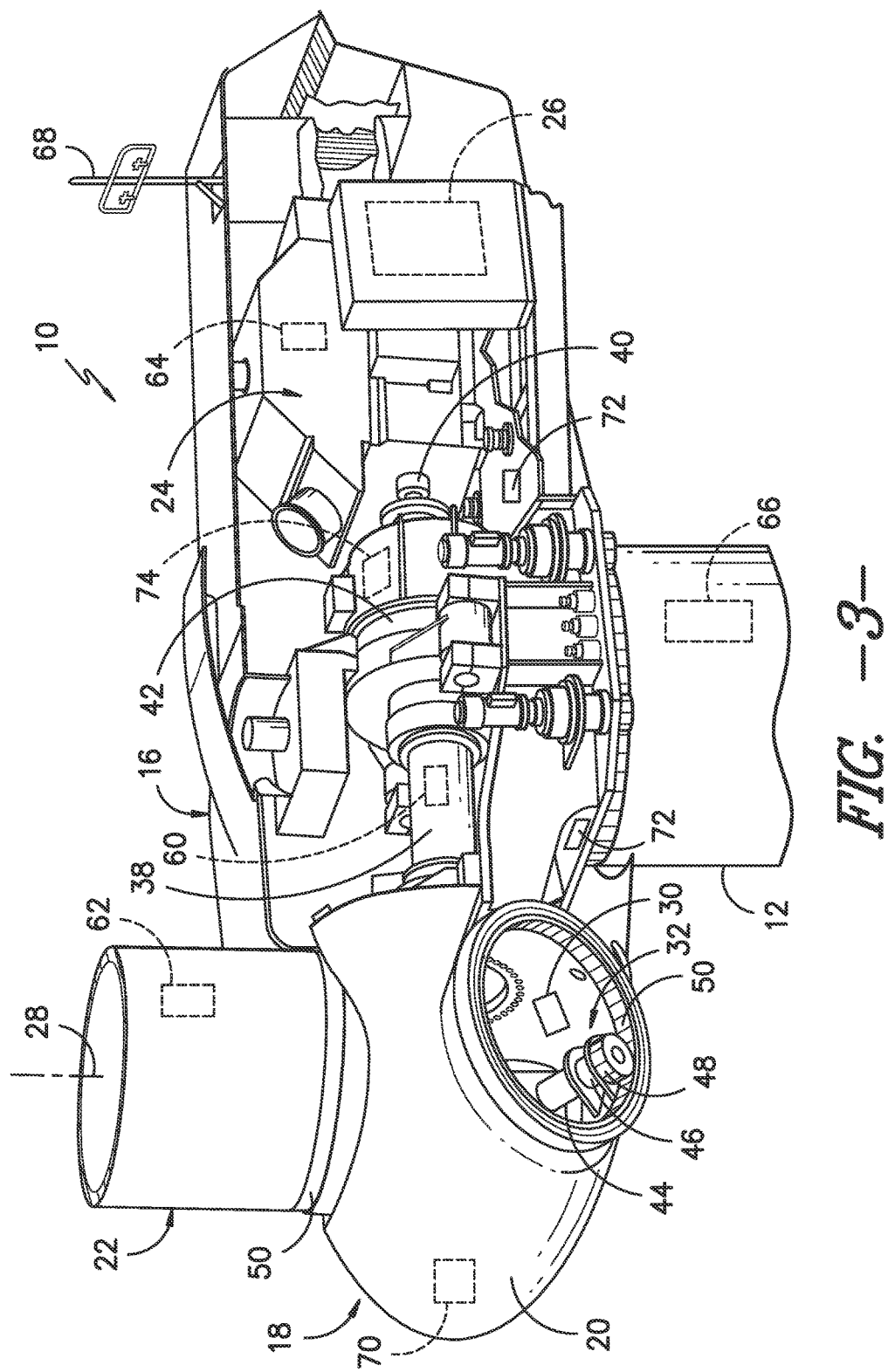
FIG. -3-

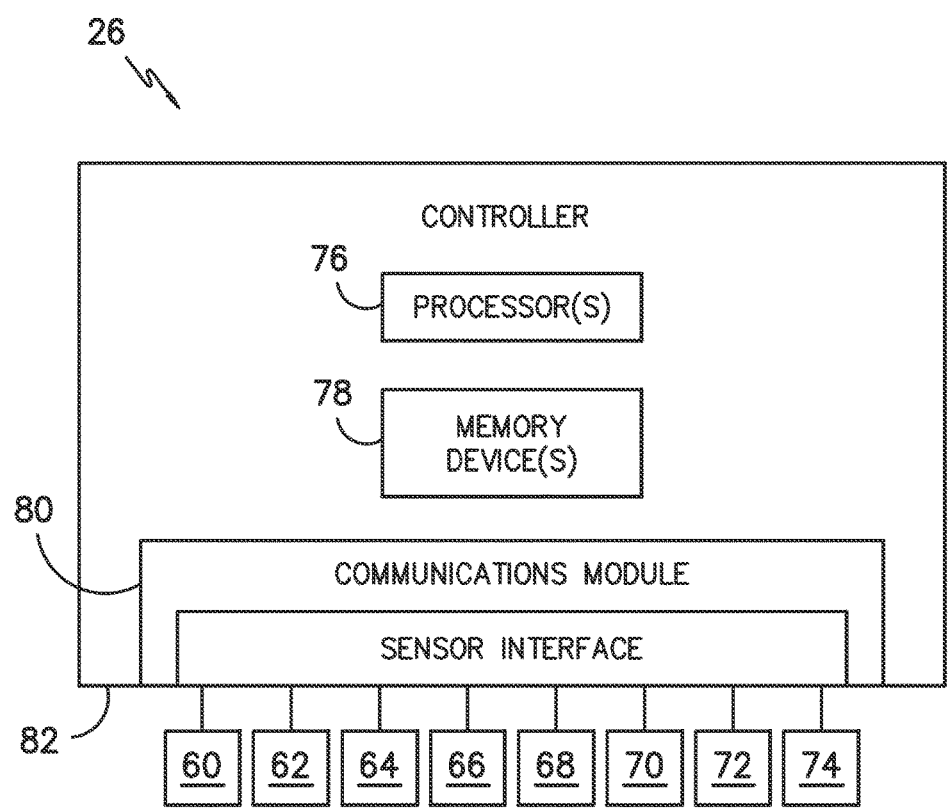
FIG. —4—

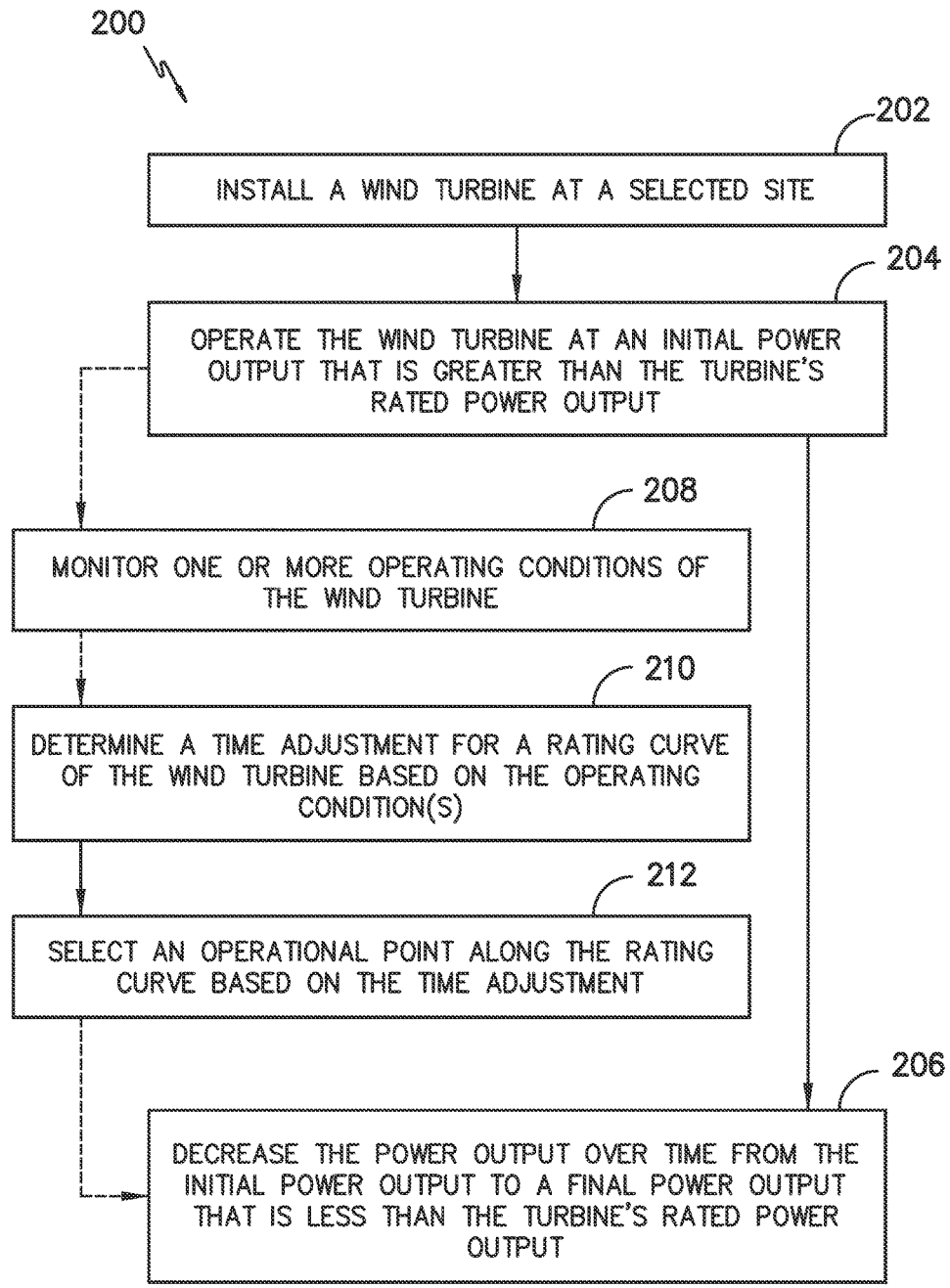
FIG. -5-

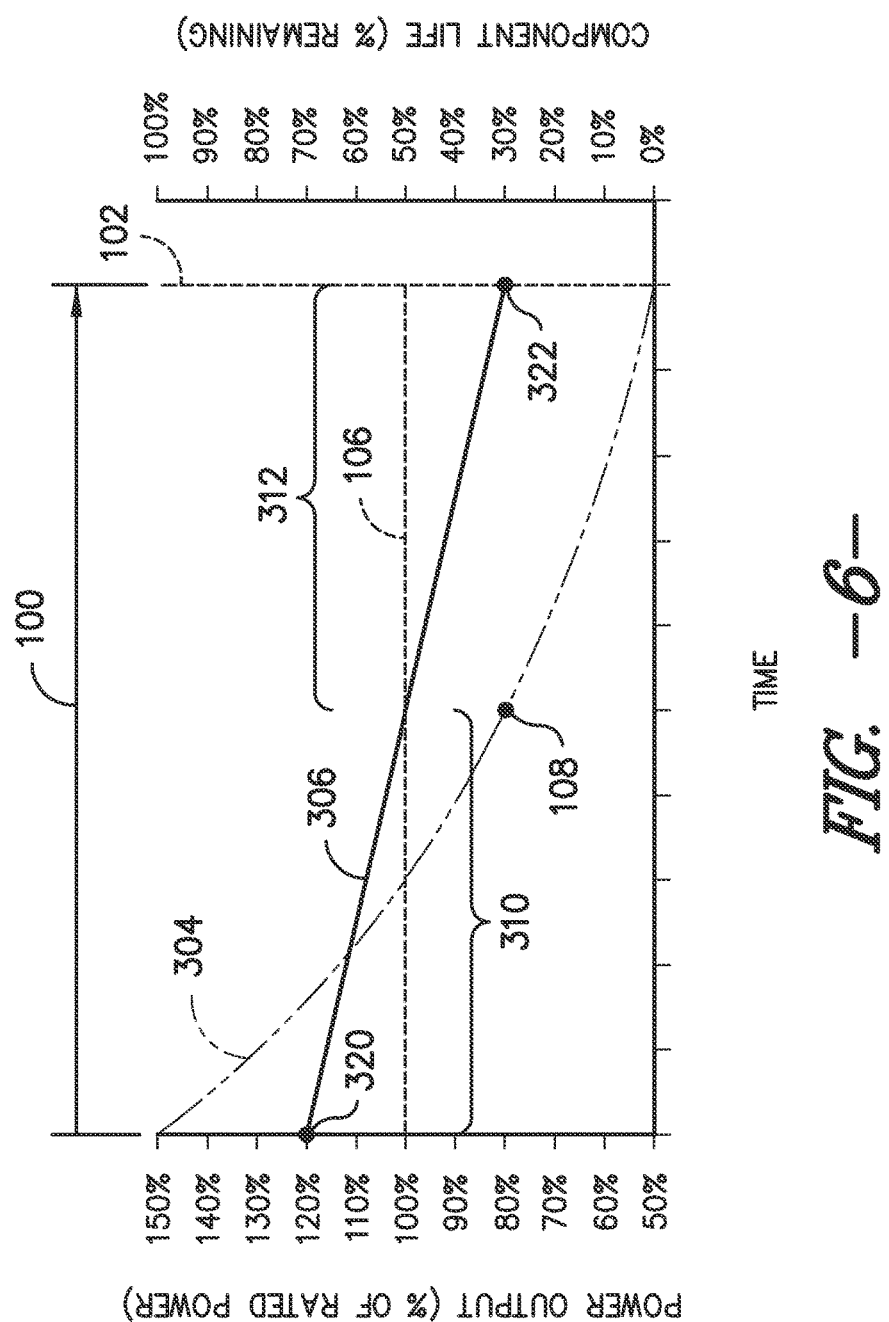
FIG. -6-

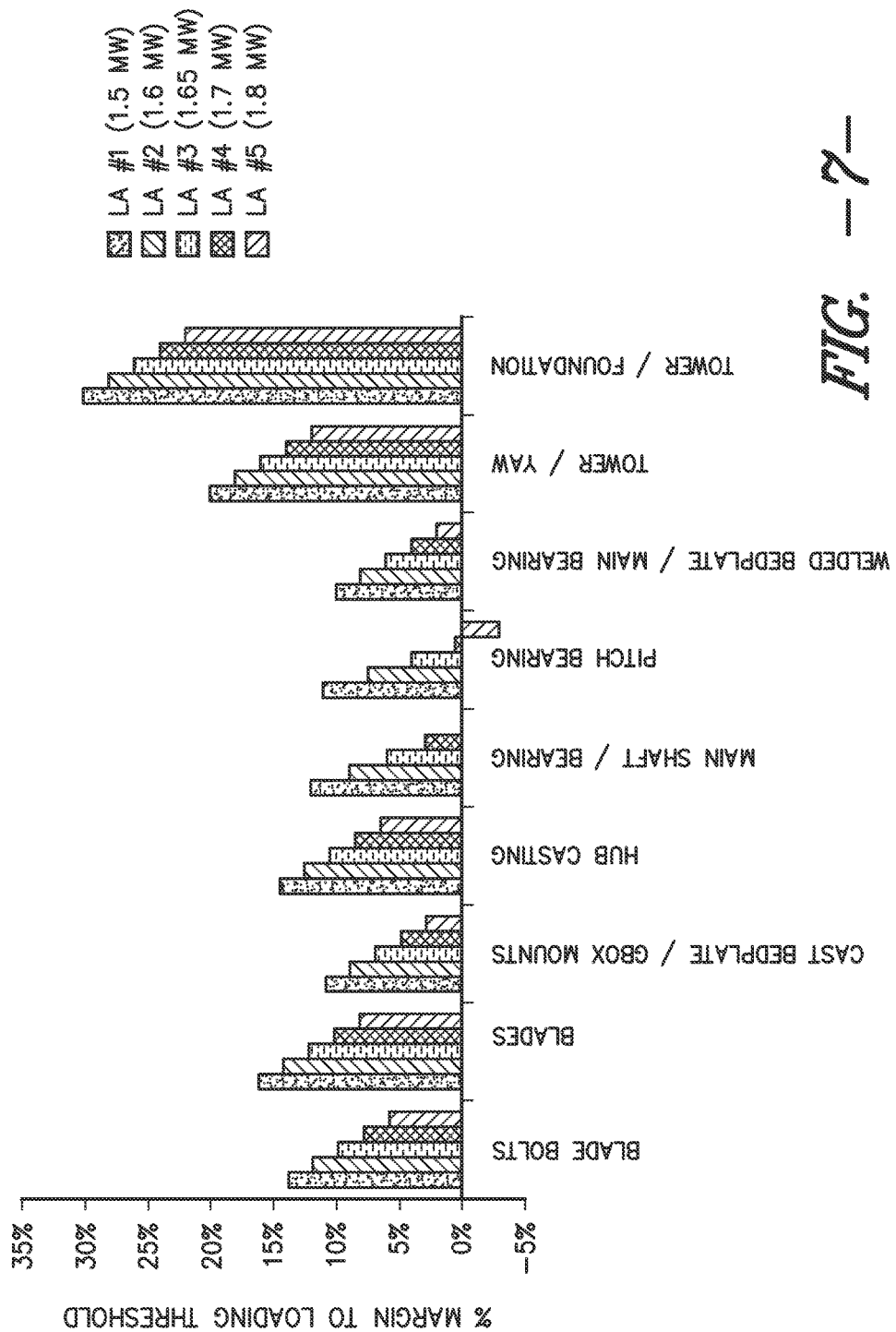
FIG. -7-

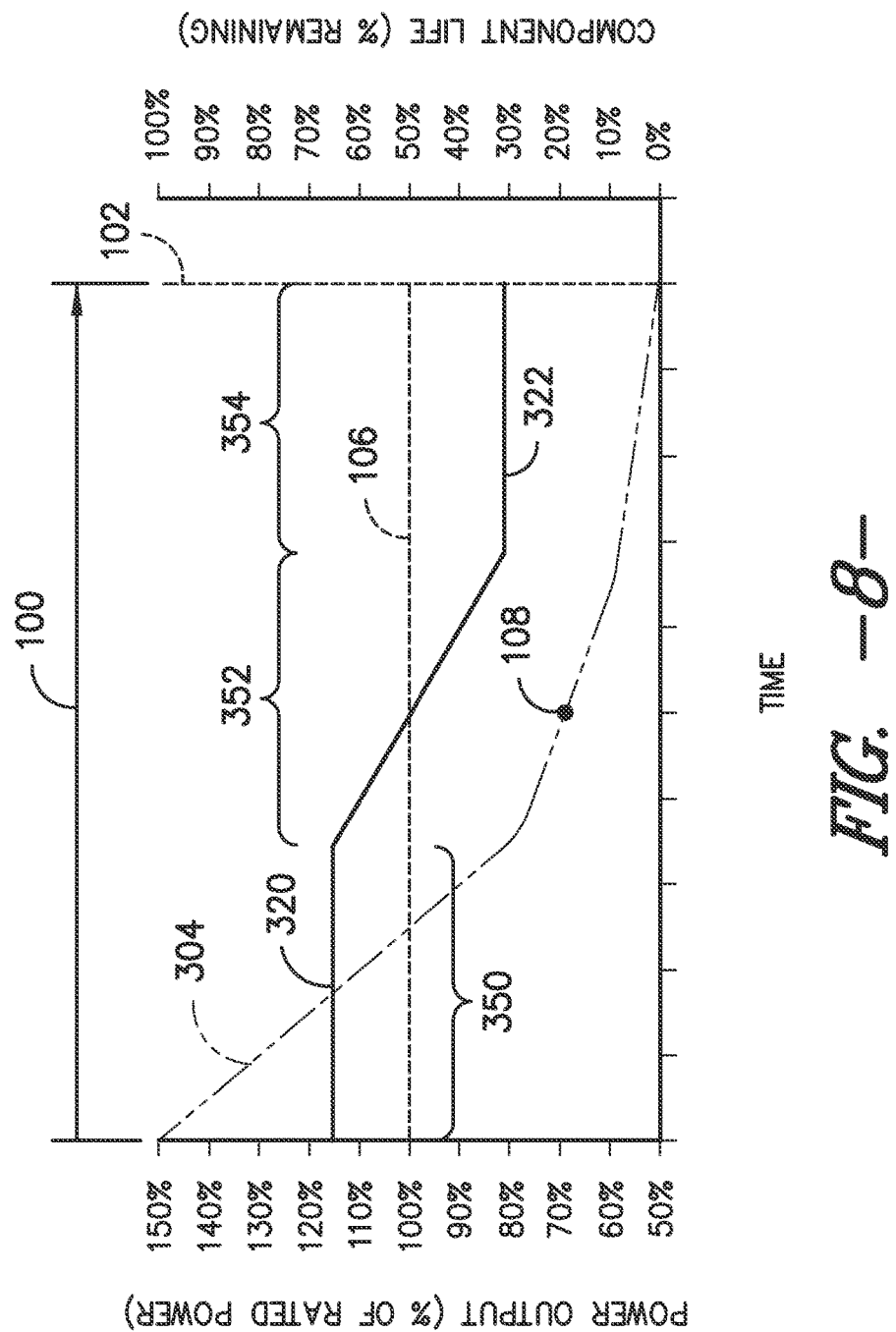
FIG. -8-

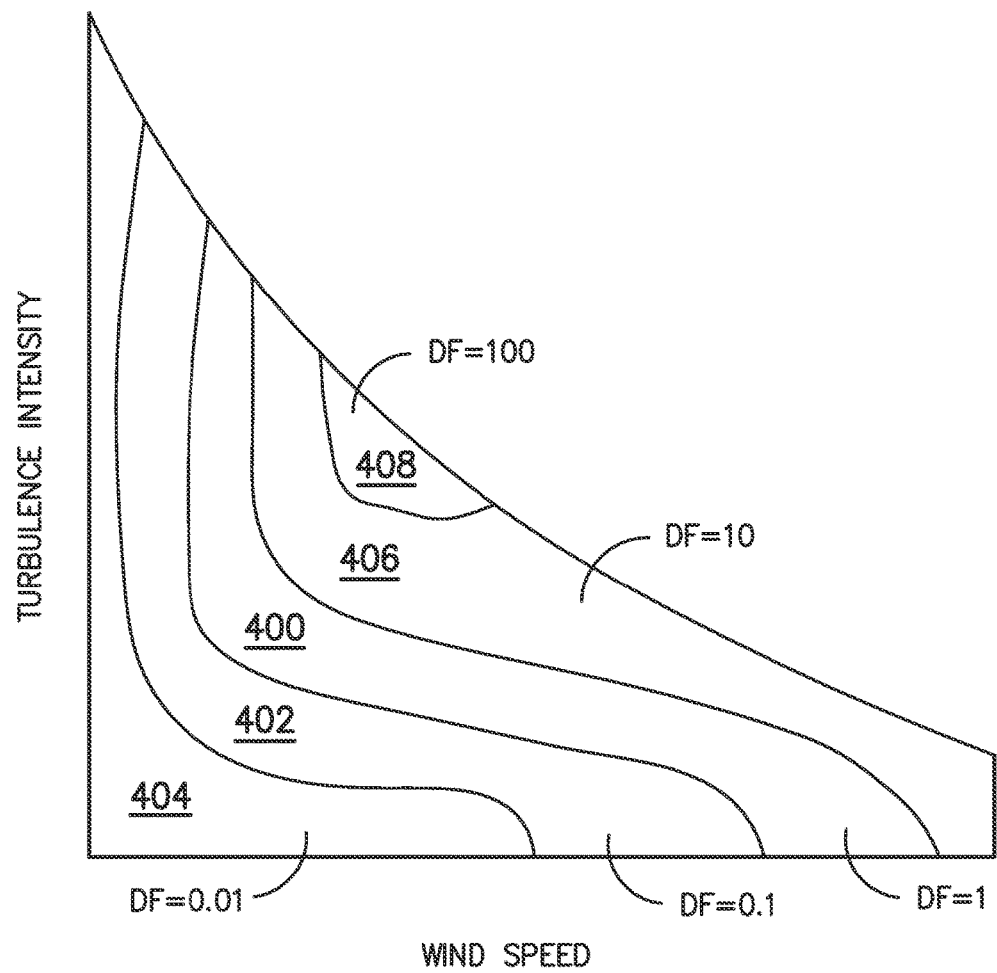
FIG. -9-

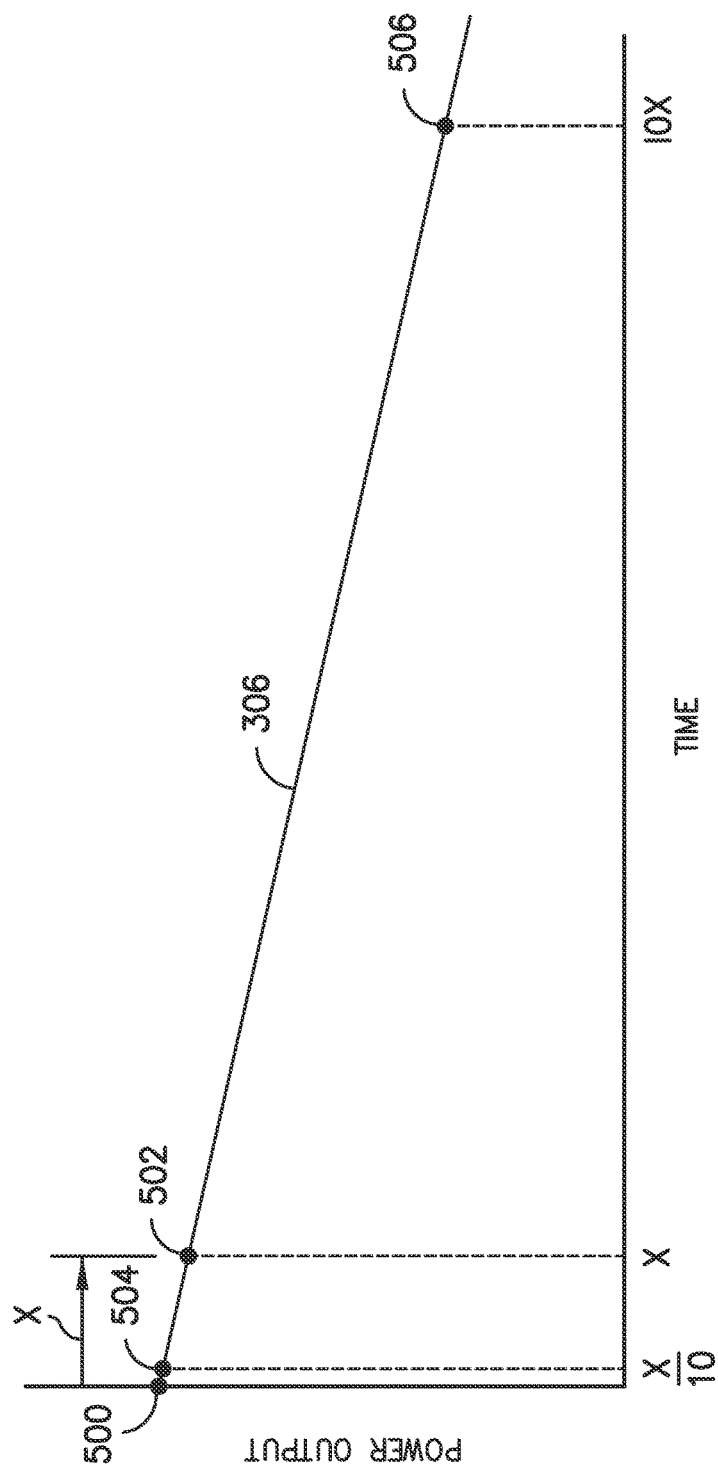

SYSTEM AND METHOD FOR CONTROLLING A WIND TURBINE

FIELD OF THE INVENTION

The present subject matter relates generally to wind turbines and, more particularly, to a system and method for controlling a wind turbine in a manner that provides for increased power output over an early portion of the turbine's operating life without resulting in a reduction in the overall operating life of the turbine.

BACKGROUND OF THE INVENTION

Wind power is considered one of the cleanest, most environmentally friendly energy sources presently available and wind turbines have gained increased attention in this regard. A modern wind turbine typically includes a tower, generator, gearbox, nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is geared to a generator for producing electricity.

Typically, a wind turbine is designed to operate at its rated power output over a predetermined or anticipated operating life. In many instances, this anticipated operating life is limited by or based upon the anticipated component life of one or more of the wind turbine components (referred to herein as "life-limiting components"). For instance, FIG. 1 illustrates example data for a conventional wind turbine having an anticipated operating life 100 (ending at dashed line 102) that is defined by the anticipated component life (indicated by component life curve 104) of one or more of its life-limiting components. As shown in FIG. 1, as the wind turbine is operated at its rated power over time (indicated by constant rating curve 106), the remaining component life for its life-limiting component(s) decreases linearly along the component life curve 104 from 100% at the wind turbine's initial start-up to about 50% at the midpoint of the turbine's anticipated life (indicated by point 108) and then to about 0% at the end 102 of the turbine's anticipated operating life 100. Thus, for such a wind turbine (assuming no other limiting or constraining design factors), the anticipated operating life 100 for the turbine is defined by the anticipated operating life of such life-limiting component(s).

Additionally, for many wind turbines, the rated power output associated with each wind turbine is well below the instantaneous maximum power output that may be achieved. Thus, it is often desirable to uprate a wind turbine in order to maximize its total power output. However, such uprating results in increased loading on the wind turbine components, thereby reducing component lives. As such, for a wind turbine having an anticipated operating life that is limited based on the anticipated component life of one or more life-limiting components, uprating the wind turbine can significantly reduce its overall operating life.

Accordingly, a system and method for controlling a wind turbine that allows the turbine's power output to be increased over an early portion of its operating life in order to increase the turbine's net present value without resulting in a reduction in the overall operating life of the turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a wind turbine. The method may generally include operating the wind turbine at an initial power output that is greater than a rated power output associated with the wind turbine. The wind turbine may have an anticipated operational life at the rated power output. In addition, the method may include decreasing a power output of the wind turbine over time in order to maintain an actual operating life of the wind turbine substantially equal to or greater than the anticipated operational life. A final power output of the wind turbine at an end of the anticipated operating life may be less than the rated power output.

In another aspect, the present subject matter is directed to a system including a wind turbine and a controller configured to control the operation of the wind turbine. The wind turbine may be associated with a rated power output and may have an anticipated operating life at the rated power output. The controller may be configured to operate the wind turbine at an initial power output that is greater than the rated power output. Additionally, the controller may be further configured to decrease a power output of the wind turbine over time in order to maintain an actual operating life of the wind turbine substantially equal to or greater than the anticipated operational life. Moreover, a final power output of the wind turbine at an end of the anticipated operating life may be less than the rated power output.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an example graph charting both power output of a wind turbine (y-axis, left) as a function of time (x-axis) and component life of one or more wind turbine components (y-axis, right) as the wind turbine is operated over time at its rated power output;

FIG. 2 illustrates a perspective view of one embodiment of a wind turbine;

FIG. 3 illustrates a simplified, perspective view of the interior of the nacelle of the wind turbine shown in FIG. 2;

FIG. 4 illustrates a schematic view of one embodiment of suitable components that may be included within a turbine controller of the wind turbine shown in FIG. 2;

FIG. 5 illustrates a flow diagram of one embodiment of a method for controlling a wind turbine in accordance with aspects of the present subject matter;

FIG. 6 illustrates an example graph charting both power output of a wind turbine (y-axis, left) as a function of time (x-axis) and component life of one or more wind turbine components (y-axis, right) as the wind turbine is operated over time along a predetermined rating curve in accordance with aspect of the present subject matter;

FIG. 7 illustrates a graph showing example results of various loading analyses (e.g., LA#1-#5) performed on a wind turbine in order to determine its loading-based maximum power output in accordance with aspects of the present subject matter;

FIG. 8 illustrates another example graph charting both power output of a wind turbine (y-axis, left) as a function of time time (x-axis) and component life of one or more wind turbine components (y-axis, right) as the wind turbine is operated over time along a different predetermined rating curve in accordance with aspect of the present subject matter;

FIG. 9 illustrates a graph providing example loading bands representative of different loading conditions occurring for a wind turbine at different combinations of operating conditions; and FIG. 10 illustrates graph showing a portion of the predetermined rating curve shown in FIG. 6, particularly illustrating adjustments that can be made when de-rating the wind turbine to account for the actual operating conditions of the turbine.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a wind turbine. Specifically, the disclosed system and method provide for a wind turbine to be operated at an initial power output that exceeds its rated power output for an early portion of the turbine's operating life. As the wind turbine continues to be operated over time, the power output may be decreased from the initial power output in order to maintain the actual operating life of the wind turbine at or above its anticipated operating life. For instance, the wind turbine may be operated at a heightened power output (i.e., above its rated power output) over a first portion of the turbine's operating life in order to increase its power output and at a reduced power output (i.e., below its rated power output) for a second portion of the turbine's operating life in order to maintain the actual operating life of the wind turbine substantially equal to or greater than its anticipated operating life. As a result of this early load bias, the net present value of the wind turbine may be increased significantly early in its life without decreasing its overall operating life.

Referring now to FIG. 2, a perspective view of one embodiment of a wind turbine 10 is illustrated in accordance with aspects of the present subject matter. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 3) positioned within the nacelle 16 to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 32 (FIG. 3) of the wind turbine 10.

Referring now to FIG. 3, a simplified, internal view of one embodiment of the nacelle 16 of the wind turbine 10 shown in FIG. 2 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the controller 26 may also be located within the nacelle 16 (e.g., within a control box or panel). However, in other embodiments, the controller 26 may be located within any other component of the wind turbine 10 or at a location outside the wind turbine (e.g., when the controller 26 is configured as a farm controller for controlling a plurality of wind turbines). As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 44 (e.g., any suitable electric motor), a pitch drive gearbox 46, and a pitch drive pinion 48. In such embodiments, the pitch drive motor 44 may be coupled to the pitch drive gearbox 46 so that the pitch drive motor 44 imparts mechanical force to the pitch drive gearbox 46. Similarly, the pitch drive gearbox 46 may be coupled to the pitch drive pinion 48 for rotation therewith. The pitch drive pinion 48 may, in turn, be in rotational engagement with a pitch bearing 50 coupled between the hub 20 and a corresponding rotor blade 22 such that rotation of the pitch drive pinion 48 causes rotation of the pitch bearing 50. Thus, in such embodiments, rotation of the pitch drive motor 44 drives the pitch drive gearbox 46 and the pitch drive pinion 48, thereby rotating the pitch bearing 50 and the rotor blade 22 about the pitch axis 28. In alternative embodiments, it should be appreciated that each pitch adjustment mechanism 32 may have any other suitable configuration that facilitates rotation of a rotor blade 22 about its pitch axis 28.

In addition, the wind turbine 10 may also include one or more sensors for monitoring various operating conditions of the wind turbine 10. For example, in several embodiments, the wind turbine 10 may include one or more shaft sensors 60 configured to monitor one or more shaft-related operating conditions of the wind turbine 10, such as the loads acting on the rotor shaft 38 (e.g., thrust, bending and/or torque loads), the deflection of the rotor shaft 38 (e.g., including shaft bending), the rotational speed of the rotor shaft 38 and/or the like. The wind turbine may also include one or more blades sensors 62 (FIGS. 2 and 3) configured to monitor one or more blade-related operating conditions of the wind turbine 10, such as the loads acting on the blades 22 (e.g., bending loads), the deflection of the blades 22 (e.g., including blade bending, twisting and/or the like), the vibration of the blades 22, the noise generated by the blades 22, the pitch angle of the blades 22, the rotational speed of the blades 22 and/or the like. Additionally, the wind turbine 10 may include one or more generator sensors 64 configured to monitor one or more generator-related operating conditions of the wind turbine 10, such as the power output of the generator 24, the rotational speed of the generator 24, the generator torque and/or the like.

Moreover, the wind turbine 10 may also include various other sensors for monitoring numerous other turbine operating conditions. For example, as shown in FIG. 3, the wind turbine 10 may include one or more tower sensors 66 for monitoring various tower-related operating conditions, such as the loads acting the tower 12, the deflection of the tower 12 (e.g., tower bending and/or twisting), tower vibrations and/or the like. In addition, the wind turbine 10 may include one or more wind sensors 68 for monitoring one or more wind conditions of the wind turbine 10, such as the wind speed, the wind direction, the turbulence or turbulence intensity of the wind and/or the like. Similarly, the wind turbine 10 may include one or more hub sensors 70 for monitoring various hub-related operating conditions (e.g., the loads transmitted through the hub 20, hub vibrations and/or the like), one or more nacelle sensors 72 for monitoring one or more nacelle-related operating conditions (e.g., the loads transmitted through the nacelle 16, nacelle vibrations and/or the like) and/or one or more gearbox sensors 74 for monitoring one or more gearbox-related operating conditions (e.g., gearbox torque, gearbox loading, rotational speeds within the gearbox and/or the like). Of course, the wind turbine 10 may further include various other suitable sensors for monitoring any other suitable operating conditions of the wind turbine 10. It should be appreciated that the various sensors described herein may correspond to pre-existing sensors of a wind turbine 10 and/or sensors that have been specifically installed within the wind turbine 10 to allow one or more operating conditions to be monitored.

It should also be appreciated that, as used herein, the term "monitor" and variations thereof indicates that the various sensors of the wind turbine 10 may be configured to provide a direct measurement of the operating conditions being monitored or an indirect measurement of such operating conditions. Thus, the sensors may, for example, be used to generate signals relating to the operating condition being monitored, which can then be utilized by the controller 26 to determine the actual operating condition. For instance, measurement signals provided by blade sensor(s) 62 that measure the deflection of each rotor blade 22 may be used by the controller 26 to determine one or more blade-related operating conditions (e.g., blade loading) and/or one or more other operating conditions of the wind turbine 10 (e.g., turbulence intensity of the wind).

Referring now to FIG. 4, a block diagram of one embodiment of suitable components that may be included within the controller 26 is illustrated in accordance with aspects of the present subject matter. As shown, the controller 26 may include one or more processor(s) 76 and associated memory device(s) 78 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 78 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 78 may generally be configured to store suitable computer-readable instructions that, when implemented by the processor(s) 76, configure the controller 26 to perform various functions including, but not limited to, implementing the methods disclosed herein.

Additionally, the controller 26 may also include a communications module 80 to facilitate communications between the controller(s) 26 and the various components of the wind turbine 10. For instance, the communications module 80 may include a sensor interface 82 (e.g., one or more analog-to-digital converters) to permit the signals transmitted by the sensor(s) 60, 62, 64, 66, 68, 70, 72, 74 to be converted into signals that can be understood and processed by the processors 76.

Referring now to FIG. 5, a flow diagram of one embodiment of a method 200 for controlling a wind turbine is illustrated in accordance with aspects of the present subject matter. As indicated above, the disclosed method 200 may be utilized to achieve increased power outputs early in a wind turbine's operating life without substantially reducing the overall operating life of the turbine 10. Specifically, during an initial operating period of the turbine's life, the wind turbine 10 may be uprated so that it is operated at a power output greater than its rated power. As a result, the various components of the wind turbine 10 may be subjected to increased loading during this initial operating period, which may lead to increased component wear/damage/ degradation. For a wind turbine 10 having an anticipated operating life that is limited by the anticipated component life of one or more of its life-limiting components, continued operation at such heightened power outputs can significantly reduce the turbine's actual operating life. Thus, in accordance with aspects of the present subject matter, the power output of the wind turbine 10 may be reduced over time from the heightened power output levels to output levels below the rated power output such that the actual operating life of the wind turbine is maintained substantially equal to or greater than its anticipated operating life.

To illustrate several principles of the present subject matter, the method 200 shown in FIG. 5 will generally be described with reference to FIG. 6, which provides a comparative example to the conventional method for wind turbine operation described above with reference to FIG. 1. Specifically, unlike the example in FIG. 1 in which the wind turbine 10 is operated continuously at its rated power along a constant rating curve (shown in FIG. 6 as dashed line 106), the wind turbine 10 is configured to be operated according to a predetermined rating curve 306 along which the power output is at increased levels (i.e., above the turbine's rated power) during an initial, first time period 310 and then transitions to reduced power outputs (i.e., below the turbine's rated power) during a subsequent second time period 312. As a result, the power production of the wind turbine 10 may be significantly increased during the first time period 310. However, such increased power ratings may also result in in a substantial increase in the rate at which the components of the wind turbine 10 are worn down, damaged or otherwise degraded. For example, as shown in FIG. 6, the remaining component life for any of the life-limiting components of the wind turbine 10 (indicated by component life curve 304) is significantly reduced during the first time period 310. Specifically, unlike the example shown in FIG. 1 in which the remaining component life at the midpoint 108 of the turbine's anticipated operating life was equal to about 50%, the remaining component life at such midpoint 108 is well below 50%. Thus, to prevent a reduction in the overall operating life of the wind turbine 10, the power rating may be reduced below the rated power output during the second time period 312 to slow component degradation. For instance, as shown in FIG. 5, the power rating may be reduced such that the component life curve 304 flattens out and extends to a point at and/or beyond the line 102 defining the end of the turbine's anticipated operating life 100, thereby ensuring that the actual operating life of the turbine 10 is substantially equally to or greater than its anticipated operating life 100.

It should be appreciated that, as used herein, the actual operating life a wind turbine 10 is "substantially equal to" its anticipated operating life if the actual operating life falls within 5% of the turbine's anticipated operating life.

As shown in FIG. 5, at (202), the method 200 includes installing a wind turbine 10 at a given wind turbine site. In several embodiments, the wind turbine 10 being installed may correspond to the only wind turbine located at such site or may correspond to one of many wind turbines forming part a wind turbine farm at the selected site. It should be appreciated that, when multiple wind turbines 10 are installed at a given site, each wind turbine 10 may be individually controlled (via each turbine's controller 26) using the methods disclosed herein. Alternatively, the wind turbines 10 may be controlled together via a farm controller.

Additionally, at (204), the method 200 includes operating the wind turbine 10 at an initial power output that is greater than its rated power output. Specifically, as indicated above, once the wind turbine 10 is installed at the site, the wind turbine 10 may be controlled during an initial operational period so that the turbine's power output is above its rated power output in order to increase the turbine's output over an early portion of its life. For example, as shown in FIG. 6, the initial power output of the wind turbine (indicated at point 320) may be well above the turbine's rated power.

It should be appreciated that the wind turbine 10 may be controlled in any suitable manner that allows such a heightened initial power output to be achieved. For example, as is generally understood, the pitch angle of the rotor blades 22 of a wind turbine 10 are typically pitched (e.g., using the pitch adjustment mechanisms 32) towards feather as wind speeds reach and exceed the turbine's rated wind speed in order to maintain the wind turbine 10 operating at its rated power output. Thus, in several embodiments, such pitching of the rotor blades 22 may be eliminated and/or delayed to allow the heightened initial power output to be achieved.

It should also be appreciated that the initial power output may generally correspond to any suitable power output that is greater than the wind turbine's rated power output. However, in several embodiments, the initial power output may be selected based on a maximum power output determined for the wind turbine 10. Specifically, a loading analysis may be performed on the wind turbine 10 to determine its maximum power output based on the load margins for the turbine's components. For example, when operating at its rated power, a substantial load margin may exist between the actual loading on the wind turbine's components and the design envelope or loading threshold for each component (i.e., the point at which a given component will actually fail due to excessive loading). Thus, by analyzing the load margins for a given wind turbine 10, the load-based maximum power output for the wind turbine 10 may be determined. This maximum power output may then be utilized as the initial power output for the wind turbine 10.

In several embodiments, the loading analysis may be performed using a computer-generated model. For example, a three-dimensional model (e.g., a finite element model) of the wind turbine 10 may be created using suitable modeling software. In doing so, the various design and/or mechanical parameters for each wind turbine component (e.g., geometry/shape, dimensions and material properties, such as poison's ratio, Young's modulus and density, etc.) may be input into the model. Thereafter, using suitable load analysis software (e.g., any suitable commercially available finite element analysis software), the operation of the wind turbine 10 may be modeled based on the turbine's known and/or expected operating conditions.

For instance, in several embodiments, site-specific wind conditions, such as an average wind speed at the site (e.g., an annual average wind speed or a twenty year average wind speed), an average wind speed distribution at the site (i.e., the distribution or profile of the wind speed over an extended period of time) and/or any other suitable site-specific operating condition(s) (e.g., wind gusts and/or turbulence intensity at the site), may be used as loading inputs to accurately model the operation of the wind turbine 10 based on its known or expected operating conditions. The resulting component loads may then be analyzed based on the loading threshold for each wind turbine component to identify the maximum rotor speed and torque setting that the wind turbine 10 may be operated without a component failure, which may then be used to determine the maximum power output of the wind turbine 10.

For instance, FIG. 7 illustrates an example data chart showing the results of various loading analyses (e.g., LA #1-#5) performed on a 1.5 MW wind turbine, with several of the wind turbine components being charted along the x-axis and the % margin to loading threshold being charted along the y-axis. As shown, at the rated power of 1.5 MW, the loading analysis indicated that a substantial load margin existed for each of the wind turbine components. However, as the rotor speed and/or torque settings of the wind turbine were increased to allow for increased power outputs, the component loads also increased, thereby reducing the load margins for each component. For instance, as shown in FIG. 7, when operating at a power output of 1.8 MW, the load margin for the pitch bearing transitions from positive to negative, thereby indicating a high likelihood that the pitch bearing would fail due to excessive loading. Thus, it may be determined that, based on the known and/or expected operating conditions of the particular wind turbine being analyzed, the maximum power output for such wind turbine is below 1.8 MW, such as at 1.7 MW or 1.75 MW. This maximum power output may then, in several embodiments, be utilized as the initial power output for the wind turbine 10.

It should be appreciated that, although a wind turbine installed within a wind farm may have the exact same design specifications as other wind turbines with the farm, the maximum power output for each wind turbine may vary due to varying operating conditions. For example, wind turbines located on the left side of a field may be subjected to lower average wind speeds and/or lower wind distributions than wind turbines located on the right side of the field (e.g., due to terrain differences, such as hills, etc.). As a result, the loading analysis may indicate that the wind turbines on the left side of the field have a higher maximum power output than the wind turbines on the right side of the field due to the lower loads acting on such wind turbines. Similarly, wind turbines located downstream of other wind turbines may be subject to vastly different operating conditions than the upstream wind turbines and, thus, the maximum power outputs may differ between the upstream and downstream wind turbines.

It should also be appreciated that, in alternative embodiments, the initial power output utilized when performing method element 204 may correspond to any other suitable power output that is greater than the rated power output for the wind turbine 10 being controlled, such as any power output between the maximum power output for such wind turbine 10 and its rated power output.

Referring back to FIG. 5, at (206), the method 200 includes decreasing the power output of the wind turbine 10 over time from the initial power output to a final power output that is less than the rated power output for the turbine. Specifically, as indicated above, the power output may be decreased over time so that an actual operating life of the wind turbine 10 is substantially equal to or greater than its anticipated operational life. For instance, as shown in FIG. 6, in several embodiments, the power output may be decreased over time between the initial power output 320 and the final power output (indicated by point 322) according to a predetermined rating curve 306. In general, this rating curve 306 may be selected such that the component life curve 304 for any life-limiting components of the wind turbine 10 extends across a time period that is substantially equal to or greater than the anticipated operating life 100 of the wind turbine 10. Thus, if the turbine's anticipated operating life is 20 years, the wind turbine 10 may be de-rated from the initial, heighted power output 320 in a manner that permits the component life of any of its life-limiting components to extend for at least about 20 years.

It should be appreciated that the predetermined rating curve may generally correspond to any suitable operating curve that allows for the wind turbine 10 to be operated across its entire anticipated operating life. For instance, as shown in FIG. 6, the predetermined rating curve 306 defines a straight line between the initial and final power outputs 320, 322 such that the power output of the turbine 10 is reduced linearly over time. However, in other embodiments, the predetermined rating curve 306 may be selected so as to define a curved line between the initial and final power outputs 320, 322.

It should also be appreciated that, in several embodiments, the predetermined rating curve 306 may be selected such that the power output of the wind turbine 10 is continuously reduced between the initial and final power outputs (e.g. as shown in FIG. 6). However, in other embodiments, the power output of the wind turbine 10 need not be continuously reduced over time. For instance, as shown in example of FIG. 8, the power output is maintained at its initial, heightened power output 320 for an extended period of time 350 prior to being reduced over a de-rating period 352. The power output is then maintained at the final power output 322 over another extended period of time 354. In such an embodiment, by carefully selecting the time periods 350, 354 for maintaining the initial and final power outputs 320, 322 as well as with the manner in which the power output is de-rated during the de-rating period 352, the actual operating life of the wind turbine 10 may be maintained substantially equal to or greater than its anticipated operating life 100 (e.g., as indicated by the component life curve 304 of FIG. 8).

Additionally, it should be appreciated that, in several embodiments, the wind turbine 10 may be operated along its predetermined rating curve 306 without reference to any of its actual operating conditions. Thus, if the time reference for the rating curve 306 is based on the operating time of the wind turbine 10 (i.e., the amount of time the turbine is actually operated), the controller 26 may simply be configured to control the turbine 10 so that its power output is maintained along the rating curve as the turbine is operated over time. Similarly, if the time reference for the rating curve 306 is based on calendar time, the controller 26 may be configured to control the turbine 10 so that its power output is maintained along the rating curve as time passes. In such an embodiment, if the wind turbine 10 has been down for any period of time, upon start-up of the turbine 10, the controller 26 may be configured to shift the current operating point along the rating curve 306 to the right to account for such downtime.

Alternatively, the controller 26 may be configured to adjust the operating point along the predetermined rating curve 306 based on one or more operating conditions of the wind turbine 10. Specifically, in several embodiments, it may be assumed that a wind turbine 10 is subjected to the average loading conditions expected or observed at its site when initially determining the reduction in component life that occurs while the turbine 10 is operating at a given power rating for any specific period of time. Thus, if it is determined that the wind turbine 10 is instead operating in lower loading conditions over the specific period of time, the operating point along the rating curve 306 may need to be adjusted in one direction to account for the reduced component wear/damage/degradation occurring during such time period. Similarly, if it is determined that the wind turbine 10 is instead operating in higher loading conditions over the specific period of time, the operating point along the rating curve 306 may need to be adjusted in the other direction to account for the increased component wear/damage/degradation occurring during such time period.

Thus, referring back to FIG. 5, at 208, the method 200 may, in several embodiments, include monitoring one or more operating conditions of the wind turbine 10. For example, as indicated above, the wind turbine 10 may include a plurality of sensors (e.g., sensors 60, 62, 64, 66, 68, 70, 72, 74) for measuring various operating conditions of the wind turbine 10. Measurement signals provided by the sensors may then be transmitted to the controller 26 to allow the controller 26 to monitor such operating condition(s).

Additionally, at 210, the method 200 includes determining a time adjustment for the predetermined rating curve 306 based on the monitored operating condition(s). Specifically, in several embodiments, the controller 26 may be configured to determine the effect of the current operating conditions for the wind turbine 10 on the component life of any of the turbine's life-limiting components. For example, in one embodiment, the controller 26 may be configured to estimate a damage factor for such component(s) based on the current operating conditions. This damage factor may then be correlated to a time adjustment for adjusting the operational point of the wind turbine 10 along the predetermined rating curve 306.

For example, FIG. 9 illustrates a graph providing example data that may be used by the controller 26 to correlate the current operating conditions of a wind turbine 10 to a corresponding damage factor that is representative of the difference between the expected change in component life over time (e.g., at average operating conditions) and the actual change in component life over time based on such current operating conditions. As shown in FIG. 9, the example data is provided as a function of wind speed (x-axis) and turbulence intensity (y-axis). However, in other embodiments, any other suitable operating conditions may be used as a basis for determining the disclosed damage factor.

As shown in FIG. 9, the graph includes a plurality of loading bands 400, 402, 404, 406, 408, with each loading band covering various different combinations of wind speed and turbulence intensity. Specifically, in the illustrated embodiment, the graph includes an average loading band 400, first and second low-loading bands 402, 404 and first and second high loading bands 406, 408. However, in other embodiments, the graph may include any other number of loading bands.

In several embodiments, the average loading band 400 may be selected so that it extends across various combinations of wind speed and turbulence intensity at which the wind turbine 10 is generally experiencing average or normal loading conditions. Additionally, the low-loading bands 402, 404 may be selected so as to extend across various combinations of wind speed and turbulence intensity at which the wind turbine 10 is operating at lower loading conditions as compared to those of the average loading band 400. Thus, as the wind speed and/or wind turbulence is reduced from those contained within the average loading band 400, the operation of the wind turbine 10 may transition into the first low-loading band 402 and, with further reductions in the wind speed and/or wind turbulence, into the second low-loading band 404. Similarly, the high-loading bands 406, 408 may be selected so as to extend across various combinations of wind speed and turbulence intensity at which the wind turbine 10 is operating at higher loading conditions as compared to those of the average loading band 400. Thus, as the wind speed and/or wind turbulence is increased from those contained within the average loading band 400, the operation of the wind turbine 10 may transition into the first high-loading band 406 and, with further increases in the wind speed and/or wind turbulence, into the second high-loading band 408.

It should be appreciated that the various loading bands 400, 402, 404, 406, 408 shown in FIG. 9 are simply provided as examples of loading bands that may be developed based on changes in turbine loading conditions as a function of wind speed and wind turbulence. One of ordinary skill in the art should readily appreciate that similar loading bands may be developed for any other suitable combination of operating conditions by modeling the wind turbine 10 based on such changing conditions or by performing any other suitable type of analysis.

Additionally, in several embodiments, each loading band 400, 402, 404, 406, 408 may be associated with a damage factor that is representative of the extent of wear/damage/degradation occurring to one or more of the life-limiting components of the wind turbine 10 while the turbine 10 is operating at a specific set of operating conditions. Thus, the damage factor may be larger for loading conditions that are above the normal or expected loading conditions and smaller for loading conditions that are below the normal or expected loading conditions. For example, in a particular embodiment of the present subject matter, the average loading band 400 may be assigned a specific damage factor, such as a damage factor of 1. Additionally, the low-loading bands 402, 404 may be assigned a damage factor that is less than the damage factor for the average loading band 400, such as a damage factor of 0.1 for the first low-loading band 402 and a damage factor of 0.01 for the second low-loading band 404. Similarly, the high-loading bands 406, 408 may be assigned a damage factor that is greater than the damage factor for the average loading band 400, such as a damage factor of 10 for the first high-loading band 406 and a damage factor of 100 for the second high-loading band 408.

Once determined, the damage factor may then be utilized to calculate a time adjustment for the predetermined rating curve 306. Specifically, in several embodiments, the damage factor may be multiplied by the amount of time over which the wind turbine 10 was operating within the loading band 400, 402, 404, 406, 408 associated with the determined damage factor. For instance, using the example damage factor values shown in FIG. 9, if the wind turbine 10 is operated within average loading band 400 over a period of ten minutes, the time adjustment may be equal to 10 minutes (i.e., 10 minutes multiplied by a damage factor of 1). However, if the wind turbine 10 is operated within the first low-loading band 402 over a period of ten minutes, the time adjustment may be equal to 1 minute (i.e., 10 minutes multiplied by a damage factor of 0.1). Similarly, if the wind turbine 10 is operated within the second high-loading band 408 over a period of ten minutes, the time adjustment may be equal to 1000 minutes (i.e., 10 minutes multiplied by a damage factor of 100).

Referring back to FIG. 5, at 212, the method 200 includes selecting an operational point along the predetermined rating curve 306 for the wind turbine 10 based on the calculated time adjustment. For example, FIG. 10 illustrates a portion of the predetermined rating curve 306 shown in FIG. 6. As shown in FIG. 10, if the controller 26 is simply configured to follow the rating curve 306 over time without accounting for time adjustments, the controller 26 may be configured to de-rate the wind turbine 10 from a first power output 500 to a second power output 502 over a given time period X. Similarly, using the example damage factor values shown in FIG. 9, the controller 26 may also be configured to de-rate the wind turbine 10 from the first power output 500 to the second power output 502 over the time period X assuming the turbine 10 is operated within the average loading band 400 for the entire time period X (due to the damage factor being equal to 1). However, when the wind turbine 10 is operating in low-loading or high-loading conditions, the calculated time adjustment may be used to adjust the operational point to a different location along the predetermined rating curve 306, thereby adjusting the amount that the wind turbine 10 is de-rated in order to account for such low/high loading conditions.

Specifically, if the wind turbine 10 is operating within one of the low-loading bands 402, 404 over the time period X, the amount that the wind turbine 10 is de-rated across the time period may be reduced to account for the decreased component loading occurring during such time period. For instance, using the example damage factor values shown in FIG. 9, if the wind turbine 10 is operating within the first low-loading band 402 over time period X, the controller 26 may be configured to de-rate the wind turbine 10 from the first power output 500 to a power output (indicated by point 504) corresponding to the power output along the predetermined rating curve 306 that is offset from the first power output 500 by a time adjustment of X/10 (i.e., due to the damage factor of 0.1). Similarly, if the wind turbine 10 is operated within one of the high-loading bands 406, 408 over the time period X, the amount that the wind turbine 10 is de-rated across the time period may be increased significantly to account for the increased component loading occurring during such time period. For instance, again using the example damage factor values shown in FIG. 9, if the wind turbine 10 is operated within the first high-loading band 406 over time period X, the controller 26 may be configured to de-rate the wind turbine 10 from the first power output 500 to a power output (indicated by point 506) corresponding to the power output along the predetermined rating curve 306 that is offset from the first power output 500 by a time adjustment of 10*X (i.e., due to the damage factor of 10). Accordingly, by using such time adjustments, the operational point of the wind turbine 10 may be accurately adjusted along the predetermined rating curve 306 to account for the actual reduction in component life occurring to a given life-limiting component based on the turbine's actual operating conditions, thereby allowing the controller 26 to enhance operational efficiency of the wind turbine 10 while still maintaining the actual operating life of the turbine 10 substantially equal to or greater than its anticipated operating life.

It should be appreciated that, in alternative embodiments, the time adjustment for the predetermined rating curve 306 may be determined using any other suitable methodology (e.g., by using a different base factor to calculate the time adjustment or by simply calculating the time adjustment directly based on one or more operating conditions of the wind turbine 10). In addition, it should be appreciated that the time adjustment may also be applied to adjust the operational point along the predetermined rating curve 206 in any other suitable manner that allows the controller 26 to at least partially account for the actual reduction in component life occurring during operation of the wind turbine 10.

Additionally, as shown in FIG. 5, while the controller 26 continues to adjust the operational point along the predetermined rating curve 306 based on the calculated time adjustments, the power output may still be decreased over time from the initial power output to the final power output (as shown at 206).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine having an anticipated operational life at a rated power output, the method comprising:
    operating the wind turbine at an initial power output that is greater than the rated power output for the wind turbine; and
    decreasing a power output of the wind turbine over time along a predetermined rating curve defined between the initial power output and a final power output at an end of the anticipated operational life of the wind turbine that is less than the rated power output the in order to maintain an actual operating life of the wind turbine substantially equal to or greater than the anticipated operational life,
    wherein a first portion of the predetermined rating curve extends between the initial power output and the rated power output such that the power output of the wind turbine is maintained above the rated power output across a first time period spanning operation along the first portion of the predetermined rating curve during which an anticipated component life for a life-limiting component of the wind turbine is reduced by greater than 50%,
    wherein a second portion of the predetermined rating curve extends between the rated power output and the final power output such that the power output of the wind turbine is maintained below the rated power output across a second time period spanning operation along the second portion of the predetermined rating curve.

2. The method of claim 1, further comprising performing a loading analysis on the wind turbine to determine a maximum power output for the wind turbine.

3. The method of claim 2, further comprising setting the initial power output of the wind turbine as the maximum power output.

4. The method of claim 1, wherein the predetermined rating curve defines a straight line between the initial power output and the final power output.

5. The method of claim 1, further comprising:
    monitoring at least one operating condition of the wind turbine; and
    determining a time adjustment for the predetermined rating curve based on the at least one operating condition.

6. The method of claim 5, further comprising selecting an operational point for the wind turbine along the predetermined rating curve based on the time adjustment.

7. The method of claim 5, further comprising determining a damage factor the life-limiting component of the wind turbine based on the at least one operating condition, wherein the time adjustment is determined based on the damage factor.

8. The method of claim 7, wherein the damage factor varies depending on a loading condition of the wind turbine.

9. The method of claim 1, wherein the anticipated operating life of the wind turbine is limited based on the anticipated component life of the life-limiting component of the wind turbine.

10. The method of claim 1, wherein a summation of the first and second time periods is equal or substantially equal to the anticipated operational life of the wind turbine.

11. A system, comprising:
a wind turbine having an anticipated operational life at a rated power output;
a controller configured to control the operation of the wind turbine, the controller being configured to operate the wind turbine at an initial power output that is greater than the rated power output, the controller being further configured to decrease a power output of the wind turbine over time along predetermined rating curve defined between the initial power output and a final power output at an end of the anticipated operational life of the wind turbine that is less than the rated power output in order to maintain an actual operating life of the wind turbine substantially equal to or greater than the anticipated operational life,
wherein a first portion of the predetermined rating curve extends between the initial power output and the rated power output such that the power output of the wind turbine is maintained above the rated power output across a first time period spanning operation along the first portion of the predetermined rating curve during which an anticipated component life for a life-limiting component of the wind turbine is reduced by greater than 50%,
wherein a second portion of the predetermined rating curve extends between the rated power output and the final power output such that the power output of the wind turbine is maintained below the rated power output across a second time period spanning operation along the second portion of the predetermined rating curve.

12. The system of claim 11, wherein the controller is further configured to perform a loading analysis on the wind turbine to determine a maximum power output for the wind turbine.

13. The system of claim 12, wherein the controller is configured to set the initial power output of the wind turbine as the maximum power output.

14. The system of claim 11, wherein the power output is continuously decreased along the predetermined rating curve between the initial power output and the final power output.

15. The system of claim 11, wherein the controller is further configured to monitor at least one operating condition of the wind turbine and determine a time adjustment for the predetermined rating curve based on the at least one operating condition.

16. The system of claim 15, wherein the controller is further configured to select an operational point for the wind turbine along the predetermined rating curve based on the time adjustment.

17. The system of claim 15, wherein the controller is further configured to determine a damage factor for the life-limiting component of the wind turbine based on the at least one operating condition and wherein the controlled is configured to determine the time adjustment based on the damage factor.

18. The system of claim 17, wherein the damage factor varies depending on a loading condition of the wind turbine.

19. The system of claim 11, wherein the anticipated operational life of the wind turbine is limited based on the anticipated component life of the life-limiting component of the wind turbine.

20. The system of claim 11, wherein a summation of the first and second time periods is equal or substantially equal to the anticipated operational life of the wind turbine.

* * * * *